No. 649,961. Patented May 22, 1900.
W. SKAIFE.
FILTER.
(Application filed June 15, 1898.)
(No Model.) 3 Sheets—Sheet 1.
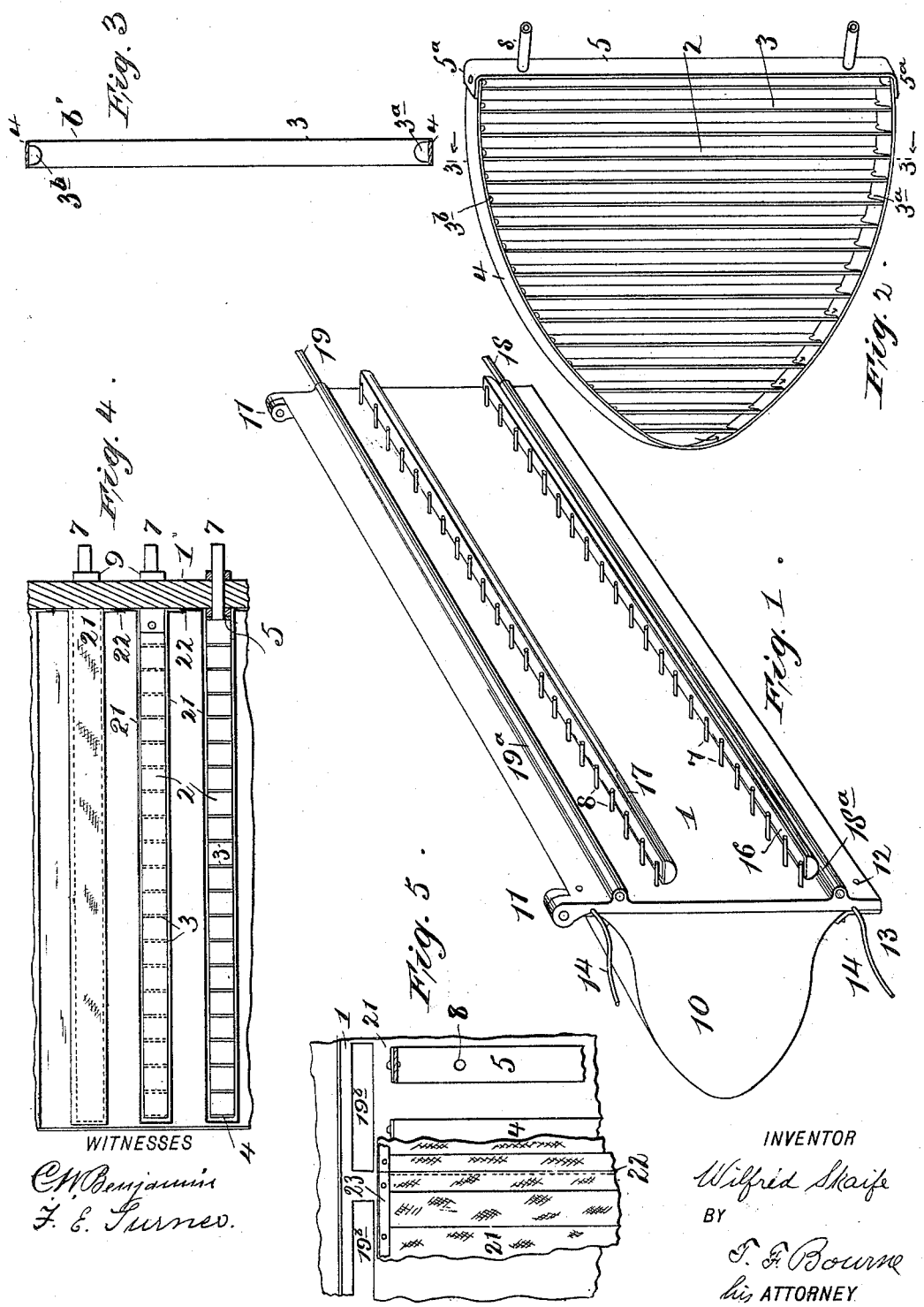
WITNESSES
C. W. Benjamin
F. E. Turner
INVENTOR
Wilfrid Skaife
BY
T. F. Bourne
his ATTORNEY

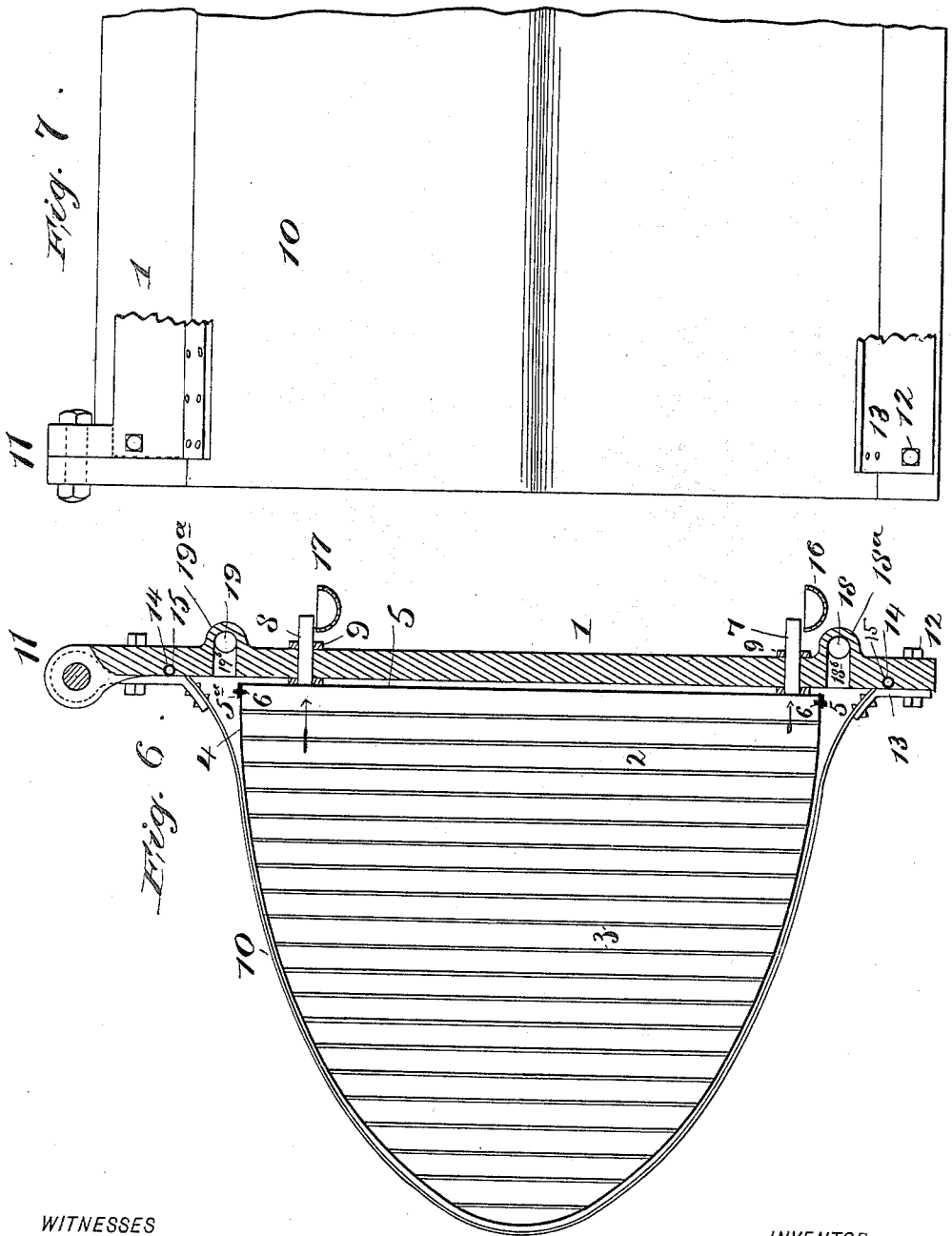

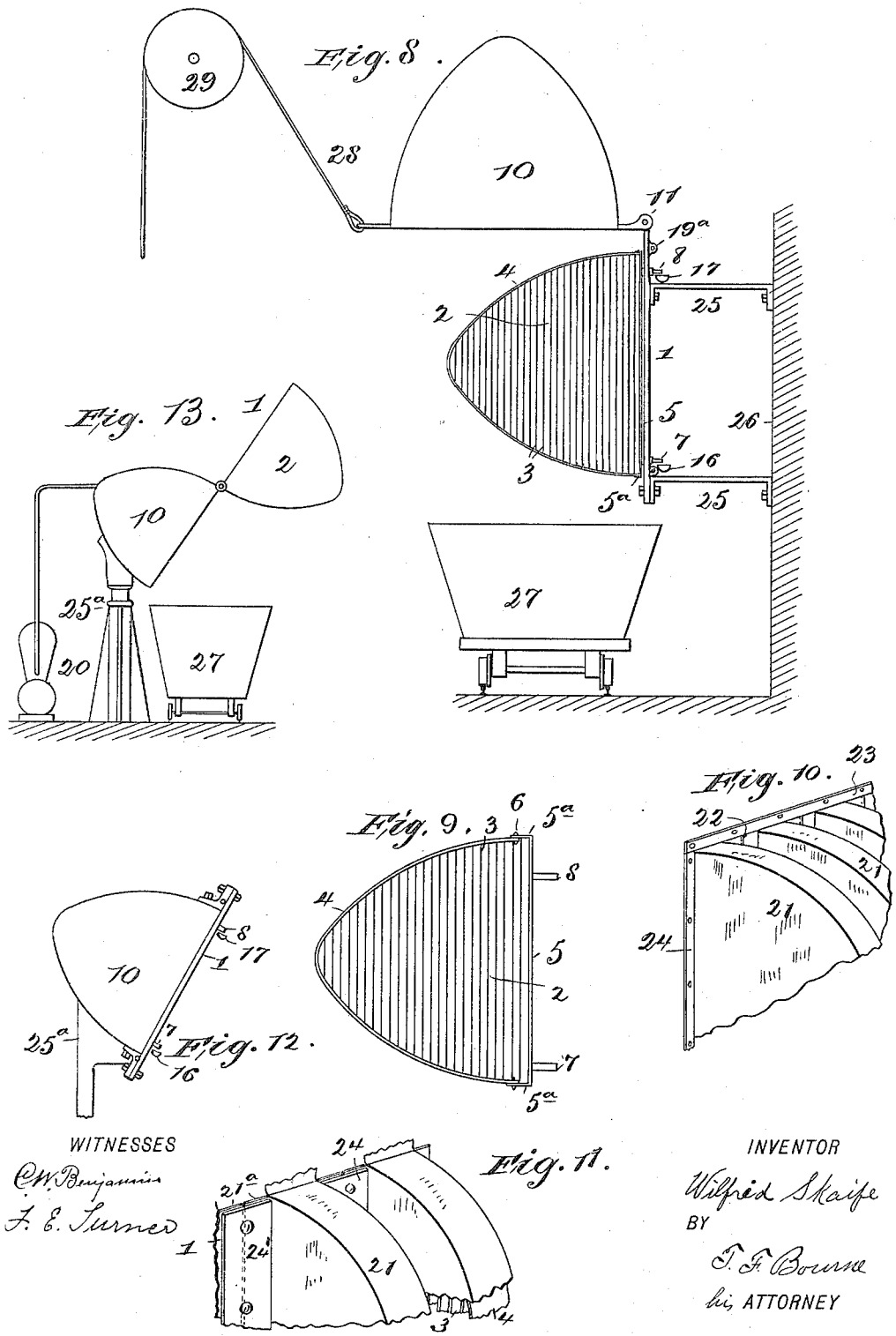

United States Patent Office.

WILFRID SKAIFE, OF MONTREAL, CANADA.

FILTER.

SPECIFICATION forming part of Letters Patent No. 649,961, dated May 22, 1900.

Application filed June 15, 1898. Serial No. 683,766. (No model.)

*To all whom it may concern:*

Be it known that I, WILFRID SKAIFE, a subject of the Queen of Great Britain, residing in Montreal, Canada, have invented certain new and useful Improvements in Filters, of which the following is a specification.

My invention relates more particularly to the class of filters adapted to filter saccharine juice and the like where sediment collects in the form of cake or "cachaza" and wherein the filtration takes place while the liquor is under pressure, so as to obtain a dry cake and save a loss in the liquor.

In the preferred form of my invention I provide a support to which are attached a plurality of filter-plates covered with cloths or bags and a movable cover adapted to inclose said plates and to be swung away therefrom to permit access thereto, and means for creating a circulation of liquor among said filter-plates.

The invention also consists in a filter comprising a support, a plurality of filter-plates pivotally supported and contained within cloths or bags, a cover to inclose said filter-plates, and means for creating a circulation of liquor among said filter-plates, whereby when the cover is removed from over said plates the cake that collects between the filter-plates can be readily removed by moving said plates laterally.

The invention also consists in a filter comprising a supporting-plate, one or more ducts carried thereby, a plurality of filter-plates carried by the supporting-plate and inclosed within a cloth or bag, outlets connected with said filter-plates and a cover adapted to inclose said filter-plates, whereby a chamber is formed around said filter-plates and in communication with said duct or ducts.

The invention also consists in the novel details of improvement and the combinations of parts that will be more fully hereinafter set forth and then pointed out in the claims.

Reference is to be had to the accompanying drawings, forming part hereof, wherein—

Figure 1 is a perspective view of a filter embodying my improvements. Fig. 2 is a perspective view, enlarged, of one of the filter-plates. Fig. 3 is a cross-section on the line 3 3 in Fig. 2. Fig. 4 is a horizontal detail section through the supporting-plate of the filter, showing the arrangement of the filter-cloths in connection with the filter-plates. Fig. 5 is a partly-broken detail edge view of Fig. 4 looking from the left in said figure. Fig. 6 is an enlarged vertical cross-section of the filter shown in Fig. 1. Fig. 7 is a front elevation of one end of the filter. Fig. 8 is a side elevation showing the manner of discharging the cake from the filter. Fig. 9 is a detail side view of one of the filter-plates. Fig. 10 is a detail perspective view showing the manner of securing the filter cloth or bag over the filter-plates. Fig. 11 is a modification thereof. Fig. 12 is an end view of a modified construction of the filter; and Fig. 13 is an elevation of the same, showing the position of the parts when discharging the cake.

In the accompanying drawings, in which similar numerals of reference indicate corresponding parts in the several views, 1 indicates a support which is shown in the form of a plate of suitable strength and dimensions, to which filter-plates 2 are attached, there being any desired number of filter-plates placed side by side at suitable distances apart. The filter-plates I have shown and which I prefer are composed of a plurality of substantially-parallel bars or strips 3, located at suitable distances apart and surrounded by a band 4, to which they are connected. The ends of the bars or strips 3 have openings or recesses $3^a$ $3^b$, which are preferably let in from the extreme ends thereof, as shown in Fig. 3, which recesses and the band 4 together form passages for liquor and air. By preference the band 4 is made oval or dome-like, and the bars or strips 3 are of such length as to properly fit between the corresponding curves of the band 4, whereby the lower portion of said band is inclined downwardly and toward the plate 1 to permit the liquor that passes into the filter-plates and travels down along the bars or strips 3 to find its way to the lower portion of the filter-plates, and thence to the outlet. The upper recesses $3^b$ more properly serve to permit the escape of air. The band 4 is connected to a support or bar 5, that extends substantially parallel to the plate 1, to which it is secured, and the band 4 is pivotally connected with said bar, so that the filter-plate may have lateral movement. I have shown the bar 5 as provided with offsets 5ª at its ends, and 6 are pivots that connect the ends of band 4 with said offsets, whereby the filter-plate is pivoted to the bar 5. It is evident, however, that the connection of parts 4 and 5 may be altered, if desired, and that any other suitable form of pivoted filter-plate may be used. By preference the parts that connect the bar 5 and the plate 1 constitute the outlets from the filter-plates, and for this purpose I provide tubes 7 8, that are connected to the bars 5 and pass through proper openings in the plate 1, to which they are secured in any suitable manner, but preferably by nuts 9, that work upon threads on the tubes 7 8. Thus when the filter-plates are inclosed within a cloth or bag, as hereinafter explained, and liquor filters through the same into the spaces in the filter-plates said liquor will find an outlet through the tubes 7 and 8, according to the height of said liquor within the filter-plate. There will be any desired number of these filter-plates parallel and side by side and connected to the plate 1, (see Figs. 1 and 4,) and these filter-plates are to be contained in a chamber, which I preferably form by means of a cover 10, which is like a shell shaped to substantially conform to the outline of band 4 and detachably or movably connected with support or plate 1 and provided with suitable ends, whereby a closed chamber around the filter-plates may be found. I have shown the cover 10 as connected with the plate 1 by means of hinges 11, suitably arranged, whereby said cover may swing upwardly to expose the filter-plates 2, as shown in Fig. 8. Thus when the cover 10 is closed against the plate 1 a chamber is provided in which the filter-plates 2 are located, and when the cover is swung upwardly and away from said filter-plates the same may be readily reached for any desired operations. The cover 10 may be held closed upon the plate 1 by means of bolts 12, shown passing through the flanges or edges 13 of said cover and through or into plate 1, or the cover may be held upon plate 1 in any suitable manner. To make a tight joint all around the junction between the cover 10 and plate 1, I have shown a hydraulic joint consisting of a rubber tube 14, placed in recess 15 in the face of plate 1, against which the cover 10 or its flanges 13 is or are adapted to fit, so that when the cover is fastened to plate 1 and water forced into tube 14 a tight joint will be formed. 16 17 are troughs, secured to plate 1 in any suitable manner and located below the projecting ends of tubes 7 8 to receive the filtered liquor therefrom.

The liquor to be filtered is to pass into the chamber formed by plate 1 and cover 10, so as to mingle with the filter-plates therein, and for this purpose I have shown the plate 1 as provided with ducts 18 19, which lie along said plate in line with said chamber, which ducts are to be connected with a pump 20 or other source of supply in any suitable manner. These ducts are shown formed by means of enlargements 18ª 19ª, cast with plate 1; but it is evident that they may be otherwise arranged, if desired. From the ducts 18 19 openings 18ᵇ 19ᵇ lead to the interior of cover 10, when that is closed against plate 1, (see Figs. 5 and 6,) for the passage of the liquor to be filtered into the filtering-chamber.

The filter-plates 2 above described are to be inclosed within filtering cloths or bags 21, which are to be held against plate 1, whereby each filter-plate will be completely inclosed within the filtering medium. (See Figs. 4, 5, 10, and 11.) While a single cloth may be placed over and properly secured around the series of filter-plates, I preferably provide a bag suitably shaped to receive each filter-plate, and by preference the adjoining edges of the various bags are stitched together at 22. (See Figs. 4, 5, and 10.) The mouths of the bags are flared outwardly and placed against the plate 1, and along the top and bottom of the bags are placed strips 23, of metal or wood, which are secured to plate 1 by bolts or screws, and along the vertical edges of the two end bags of the series are similar strips 24, also secured to the plate 1, (see Fig. 10,) which strips 23 24 lie against the flaring mouths of the bags, and thus securely hold said bags against the plate 1. If preferred, the bags may be independent, in which case the abutting edges of the mouths at 21ª will be placed close together, and vertical strips 24', placed between the bags and secured to plate 1, will hold the edges of the bags securely in place, as shown in Fig. 11. In either case when it is desired to reach the filter-plates 2 or to replace the bags or cloth 21 the strips 23 24 24' can be removed and then the bags can be readily taken away from the filter-plates. By having a number of bags secured together like a series of pockets it will be seen that the operation of removing and replacing the filtering medium can be very quickly accomplished.

Any suitable means may be provided for supporting the filter. In Fig. 8 I have shown the plate 1 as secured to brackets 25, that project from a wall 26. In Figs. 12 and 13 I have shown the chamber or cover 10 as secured to a support 25ª, and in this case the arrangement is such that the plate 1, with the attached filter-plates 2, can be swung outwardly and upwardly while the cover remains stationary, instead of having the plate 1 stationary and the cover swung up, as in the other figures. In either case the filter may be held sufficiently high to enable a car, wagon, or other receptacle 27 to pass under the same to receive the cake from the filter-cloths.

The operation of the filter is as follows: After the cloths or bags are properly adjusted around the filter-plates 2 the parts 1 and 10 are secured together and the liquor is pumped into the chamber thus formed through the ducts 18 or 19 and percolates through the filtering-cloth, entering the plates 2. The filtered liquor finds an outlet through tubes 7 and 8 into troughs 16 17 and the cake or cachaza that forms within the filter will be gradually deposited higher and higher along the cloths in the usual manner. When it is desired to clean the filter, the cover 10 is raised, as indicated in Fig. 8, which may be done by means of a rope 28 or the like, passing over a pulley 29, or the plate 1, with the attached filter-plates 2, will be raised, as in Fig. 13. The operator then moves each filter-plate 2 sidewise sufficiently to dislodge the cake or cachaza that has collected between each two plates, whereupon the same will fall away and the cloths may be scraped, if desired. When the cake is all thus removed, the filter-plates will be adjusted back to their proper positions and the cover 10 and plate 1 again secured together. From this it will be seen that by having the laterally-movable or pivoted filter-plates the operation of cleaning the filter is very rapid and the plates do not have to be handled in the ordinary manner of constructing filters, where the plates are removable from the filtering-chamber. While the plates 1 and cover 10 are separated, the interior of the cover can be readily scraped to remove the cake adhering thereto. My improvements are as equally applicable to the filtration of liquors which contain very little sediment as to liquor containing a large proportion of sediment and in which pressure is required to get a dry cake, and so save a loss in liquor. By taking out half of the filter-plates a very thick cake could be formed without extra expense. Water and steam connections may be provided for sluicing out, in any well-known manner.

I do not limit my invention to the precise details of construction shown and described, as they may be varied without departing from the spirit thereof.

Having now described my invention, what I claim is—

1. A filter comprising a filtering-chamber, pivotal filter-plates supported therein to enable ready removal of collected cake, and means for creating a circulation of liquor among said filter-plates, substantially as described.

2. A filter comprising a support, filter-plates pivotally connected therewith to enable ready removal of collected cake, a cover to inclose said filter-plates, and means for creating a circulation of liquor among said filter-plates, substantially as described.

3. A filter comprising a support, pivotal filter-plates connected therewith to enable ready removal of collected cake, a hollow or trough-like cover pivotally connected with said support and adapted to inclose said filter-plates, and means for creating a circulation of liquor within said cover, substantially as described.

4. A filter comprising a support, a plurality of filter-plates connected therewith, a tube or tubes leading from each filter-plate through said support, and a hollow or trough-like cover adapted to fit against said support and to inclose said filter-plates, substantially as described.

5. A filter comprising a support, filter-plates connected therewith, a hollow or trough-like cover adapted to fit against said support and to inclose said filter-plates, and a duct or ducts carried by said support and leading to the interior of said cover, substantially as described.

6. A filter comprising a support, a plurality of filter-plates each having a tube or tubes connected with and leading from said support, a duct or ducts connected with said support, and a hollow or trough-like cover adapted to fit against and to inclose said filter-plates, substantially as described.

7. A filter comprising a support, a plurality of pivotal filter-plates, tubes extending therefrom and connected with said support, a cover to fit against said support and to inclose the filter-plates, and means for creating circulation among said filter-plates within said cover, substantially as described.

8. A filter comprising a support consisting of a plate having ducts cast integral therewith and opening through one side thereof, filter-plates connected with said support, outlets for said filter-plates, and a hollow or trough-like cover connected with said support and adapted to fit against the same and to inclose said filter-plates, substantially as described.

9. A filter comprising a support, filter-plates connected therewith and consisting of parallel strips, a band surrounding the same, a bar to which said band is pivotally connected, tubes carried by said bars and connected with said support, a hollow or trough-like cover adapted to fit against said support and to inclose said filter-plates, and means for creating a circulation of liquor among said filter-plates, substantially as described.

10. A filter comprising a supporting-plate, a series of filter-plates consisting of parallel strips and a band surrounding them, said strips having openings or recesses at one or both ends for the passage of liquor, said band being pivotally connected with a bar that is carried by the supporting-plate, a hollow or trough-like cover to fit against said supporting-plate and adapted to receive said filter-plates, and means for creating a circulation of liquor among said plates whereby the filter-plates can be moved sidewise to enable removal of collected cake from between them, substantially as described.

11. In a filter, the combination of a support, a plurality of filter-plates connected therewith, means for supporting said filter-plates so they may have lateral movement to enable removal of collected cake and a filtering medium for said plates comprising a plurality of bags adapted to receive said plates, strips to hold said bags against the support, and means for inclosing said filter-plates, substantially as described.

12. In a filter, the combination of a support, a plurality of filter-plates connected therewith, means for supporting said filter-plates so they may have lateral movement to enable removal of collected cake, a filtering medium for said plates comprising a bag or pocket for each plate, the edges of the contiguous bags being connected together, strips for holding said bags against the support, and means for inclosing said filter-plates, substantially as described.

13. A filter-plate comprising a plurality of substantially-parallel bars or strips, a band surrounding them, and a bar to which said band is pivotally connected, substantially as described.

14. A filter comprising a plurality of substantially-parallel bars or strips, a band surrounding the same, a bar pivotally connected with said band, and one or more tubes connected with said bar, substantially as described.

15. A filter-plate comprising a plurality of substantially-parallel bars or strips, a band surrounding the same, said bars or strips having recesses or openings at one or both ends, and a bar to which said band is pivotally connected, substantially as described.

16. A filter-plate comprising a plurality of substantially-parallel bars or strips, a band surrounding the same, said bars or strips having recesses or openings at one or both ends, a bar to which said band is pivotally connected, and a tube or tubes projecting from said last-mentioned bar, substantially as described.

17. A filter-plate comprising a plurality of substantially-parallel strips, a band surrounding them, and a bar having offsets at its ends to which said band is pivoted, substantially as described.

18. A filter-plate comprising a plurality of substantially-parallel strips, a band surrounding them, a bar having offsets at its ends to which said band is pivoted, and a tube or tubes extending from said bar, substantially as described.

19. In a filter, a hollow or trough-like receptacle, a plate to close the same, a hydraulic joint between said parts, and filter-plates within the receptacle, substantially as described.

20. In a filter, a hollow or trough-like receptacle, a plate to close the same, an expansible tube between the meeting parts of said receptacle and plate adapted to make a tight joint, means for holding the parts firmly together, and filter-plates within the receptacle, substantially as described.

21. In a filter, a hollow or trough-like receptacle, a plate against which said receptacle can fit, said plate having a groove in line with the meeting parts of the receptacle, an expansible tube in said groove, and filter-plates within the receptacle, whereby when the tube is inflated a tight joint will be made between the receptacle and the plate, substantially as described.

22. A filter comprising a filtering-chamber, filter-plates supported therein so as to have lateral movement to enable ready removal of collected cake, and means for creating a circulation of liquor among said plates, substantially as described.

WILFRID SKAIFE.

Witnesses:
C. H. HANNAUD,
THEO. DOUCET.